(12) United States Patent
Chudy et al.

(10) Patent No.: US 9,092,865 B2
(45) Date of Patent: Jul. 28, 2015

(54) MAP GENERATION FOR AN ENVIRONMENT BASED ON CAPTURED IMAGES

(71) Applicant: Lenovo Enterprise Solutions (Singapore) PTE. LTD., Singapore (SG)

(72) Inventors: David D. Chudy, Raleigh, NC (US); James G. McLean, Fuquay-Varina, NC (US); Cristian Medina, Durham, NC (US); Michael T. Shelton, Jr., Cary, NC (US)

(73) Assignee: LENOVO ENTERPRISE SOLUTIONS (SINGAPORE) PTE. LTD., Serangoon Garden (SG)

(*) Notice: Subject to any disclaimer, the term of this patent is extended or adjusted under 35 U.S.C. 154(b) by 120 days.

(21) Appl. No.: 13/968,533

(22) Filed: Aug. 16, 2013

(65) Prior Publication Data

US 2015/0049905 A1    Feb. 19, 2015

(51) Int. Cl.
   *G06K 9/00*    (2006.01)
   *G06T 7/00*    (2006.01)

(52) U.S. Cl.
   CPC ..................... *G06T 7/0044* (2013.01)

(58) Field of Classification Search
   None
   See application file for complete search history.

(56) References Cited

U.S. PATENT DOCUMENTS

| | | | |
|---|---|---|---|
| 7,725,212 B2 | 5/2010 | Prasse | |
| 8,271,639 B2 | 9/2012 | Joukov | |
| 2009/0319640 A1 | 12/2009 | Kugel | |
| 2010/0023859 A1 | 1/2010 | Dawson et al. | |
| 2010/0027894 A1* | 2/2010 | Dahari | 382/218 |
| 2010/0164990 A1 | 7/2010 | Van Doorn | |
| 2011/0210167 A1* | 9/2011 | Lyon | 235/375 |
| 2011/0218730 A1 | 9/2011 | Rider et al. | |
| 2011/0241833 A1* | 10/2011 | Martin et al. | 340/10.1 |
| 2012/0185590 A1* | 7/2012 | Kolin et al. | 709/224 |
| 2012/0221241 A1* | 8/2012 | Nurmi | 701/438 |
| 2012/0249588 A1* | 10/2012 | Tison et al. | 345/633 |
| 2012/0313963 A1 | 12/2012 | Chen-Quee et al. | |
| 2013/0026220 A1* | 1/2013 | Whelihan | 235/375 |
| 2013/0031202 A1 | 1/2013 | Mick et al. | |
| 2015/0035823 A1* | 2/2015 | Arsan et al. | 345/419 |

FOREIGN PATENT DOCUMENTS

| | | |
|---|---|---|
| EP | 2378488 A2 | 10/2011 |
| JP | 2012256276 A | 12/2012 |
| WO | WO2007020591 A2 | 2/2007 |

OTHER PUBLICATIONS

S. Deffeyes, "Mobile auigumented reality in the data center," IBM J. Res. & Dev. vol. 55 No. 5 Paper 5 Sep./Oct. 2011.*

(Continued)

*Primary Examiner* — Matthew Bella
*Assistant Examiner* — Soo Shin
(74) *Attorney, Agent, or Firm* — Olive Law Group, PLLC

(57) ABSTRACT

Systems and methods for map generation for an environment based on captured images are disclosed. According to an aspect, a method includes capturing a first image of an environment. The method also includes identifying a reference in the first image. Further, the method includes generating, based on the identified reference, a map of the environment to use for physically orienting a computing device within the environment based on a second image including the reference.

20 Claims, 5 Drawing Sheets

(56) References Cited

OTHER PUBLICATIONS http://pic.dhe.ibm.com/inforcenter/director/v6r1x/index.jsp?topic=/director.systemx_bc_6.1/fqm0_r_x_light_path_diagnostic_led_data.html, accessed Mar. 17, 2013.

IPCOM000214056D, "Data Model and Intelligent Engine to Track Virtual Systems and the Associated Physical System and their Location", published Jan. 6, 2012, 4 pages.

IPCOM000143192D, "Automated Method for Physically Mapping HW Locations in a Data Center", published Nov. 16, 2006, 3 pages.

IPCOM000189647D, "System for Displaying Alerts or Information in an Augmented Reality Systems", published Nov. 13, 2009, 1 page.

IPCOM000216998D, "Method and Apparatus for Integrating Physical Location in Server Management", published Apr. 27, 2012, 14 pages.

IPCOM000224871D, "Systems and Methods to Map a Server Room", published Jan. 9, 2013, 6 pages.

IPCOM000222471D, "Augmented Reality Links to System Management", published Oct. 10, 2012, 2 pages.

IPCOM000190078D, "System for Augmented Reality Visualization of Systems Management Data", published Nov. 16, 2009, 6 pages.

http://pic.dhe.ibm.com/infocenter/director/v6r2x/index.jsp?topic=%2Fcom.ibm.director.systemx_bc.helps.doc%2Ffgm0_t_x_bc_using_light_path_diagnostic_leds.html, accessed Mar. 17, 2003.

* cited by examiner

MAP GENERATION FOR AN ENVIRONMENT BASED ON CAPTURED IMAGES

BACKGROUND

1. Field of the Invention

The present invention relates to mapping, and more specifically, to map generation for an environment based on captured images.

2. Description of Related Art

A server farm or server cluster includes a number of computer servers. In some cases, hundreds or thousands of servers may be contained within a single facility, often referred to as a data center. One difficulty with managing a data center is locating a server or other equipment that needs servicing or attention.

One solution for locating a server includes providing guidance to a servicer by activating light emitting diodes (LEDs) of different colors located on a front of the server. Such lights can indicate the servers that have failed or which ones a servicer are trying to locate. However, in some instances, many servers may need servicing and multiple lights can make it difficult to locate a particular server requiring service. For at least this reason, there is a need for improved techniques for locating data center servers that require service.

BRIEF SUMMARY

Disclosed herein are systems and methods for map generation for an environment based on captured images. According to an aspect, a method includes capturing a first image of an environment. The method also includes identifying a reference in the first image. Further, the method includes generating, based on the identified reference, a map of the environment to use for physically orienting a computing device within the environment based on a second image including the reference.

According to another aspect, a method includes receiving a map that identifies a position of a reference within an environment. The method also includes capturing an image including the reference. Further, the method includes presenting, via a user interface, an indicator of an orientation within the environment based on the captured image and the map.

DETAILED DESCRIPTION

Figure 1:
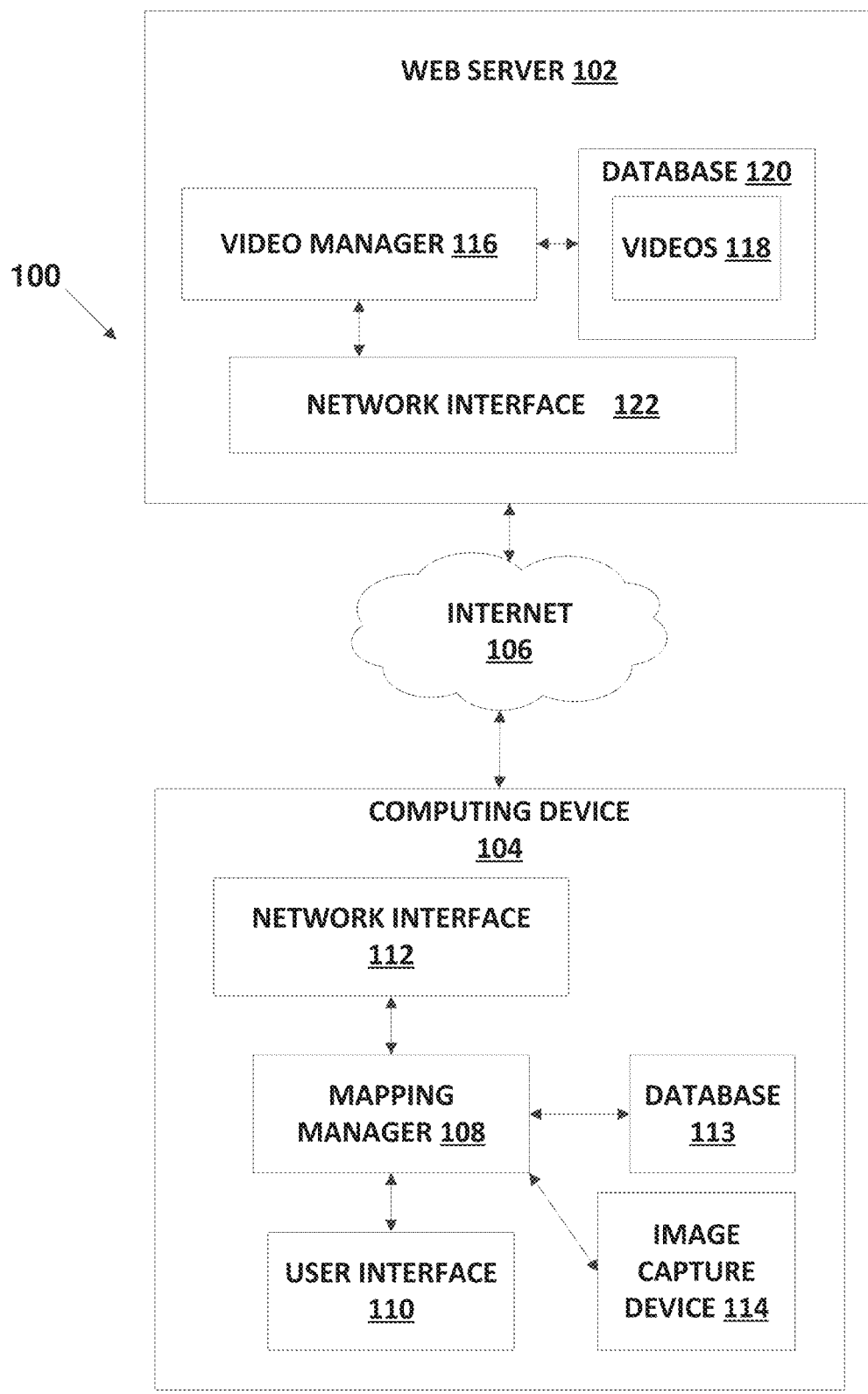
FIG. 1 is a block diagram of an example system for generating a map of an environment in accordance with embodiments of the present invention.

As described herein, there are various embodiments and aspects of the present invention. Particularly, disclosed herein are systems and methods for display of video content based on a context of user interface. As an example, a user may operate a computing device to play and preview video content residing on his or her computing device or provided by another computing device. The user's computing device may determine a context of user interface and identify one or more portions of video content associated with the context. For example, a video content portion may be one or more frames of a video. Subsequently, the video content portion may be displayed to the user for previewing the video content to the user and for assisting the user in determining whether to play the video content.

As referred to herein, the term "computing device" should be broadly construed. It can include any type of device capable of presenting a media item to a user. For example, the computing device may be an e-book reader configured to present an e-book to a user. In an example, a computing device may be a mobile device such as, for example, but not limited to, a smart phone, a cell phone, a pager, a personal digital assistant (PDA, e.g., with GPRS NIC), a mobile computer with a smart phone client, or the like. In another example, a computing device can also include any type of conventional computer, for example, a desktop computer or a laptop computer. A typical computing device is a wireless data access-enabled device (e.g., an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on a mobile device, the examples may similarly be implemented on any suitable computing device, such as a laptop or desktop computer.

As referred to herein, the term "video" should be broadly construed as any suitable electronic medium for storing one or more image frames. The video may be presented to a user via any suitable computing device. For example, video may be presented via Adobe Systems Incorporated's flash video technology, hypertext markup language (HTML) technology, or the like. A video may include audio and multiple frames of video.

As referred to herein, a "user interface" is generally a system by which users interact with a computing device. An interface can include an input for allowing users to manipulate a computing device, and can include an output for allowing the system to present information (e.g., e-book content) and/or data, indicate the effects of the user's manipulation, etc. An example of an interface on a computing device includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. The display object can be displayed on a display screen of a computing device and can be selected by and interacted with by a user using the interface. In an example, the display of the computing device can be a touch screen, which can display the display icon. The user can depress the area of the display screen at which the display icon is displayed for selecting the display icon. In another example, the user can use any other suitable interface of a computing device, such as a keypad, to select the display icon or display object.

Operating environments in which embodiments of the present subject matter may be implemented are also well-known. In a representative embodiment, a computing device is connectable (for example, via WAP) to a transmission functionality that varies depending on implementation. Thus, for example, where the operating environment is a wide area wireless network (e.g., a 2.5G network, a 3G network, or a 4G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, embodiments in accordance with the present disclosure may be implemented in other and next-generation mobile networks and devices as well. The mobile device is the physical equipment used by the end user, typically a subscriber to the wireless network. Typically, a mobile device is a 2.5G-compliant device, 3G-compliant device, or 4G-compliant device that includes a subscriber identity module (SIM), which is a smart card that carries subscriber-specific information, mobile equipment (e.g., radio and associated signal processing devices), a user interface (or a man-machine interface (MMI)), and one or more interfaces to external devices (e.g., computers, PDAs, and the like). The computing device may also include a memory or data store.

The presently disclosed subject matter is now described in more detail. For example, FIG. 1 illustrates a block diagram of an example system 100 for generating a map of an environment in accordance with embodiments of the present invention. Referring to FIG. 1, the system 100 includes a web server 102 and a computing device 104 communicatively connected via the Internet 106 by use of any suitable communications technology (e.g., wide area network (WAN), mobile network, local area network (LAN), and the like) and communications protocol (e.g., HTTP, HTTPS, and the like). Although in this example the web server 102 and the computing device 104 are connected via the Internet 106, these devices may alternatively be connected via any type of suitable network connection. The computing device 104 may be any suitable type of computing device capable of presenting media content, such as video content, a website, text content, a computing device application, and the like, to a user. This representation of the web server 102 and the computing device 104 is meant to be for convenience of illustration and description, and it should not be taken to limit the scope of the present subject matter as one or more functions may be combined. Typically, these components are implemented in software (as a set of process-executable computer instructions, associated data structures, and the like). One or more of the functions may be combined or otherwise implemented in any suitable manner (e.g., in hardware, in firmware, in software, combinations thereof, or the like).

The computing device 104 may include a mapping manager 108 for generating a map of an environment based on captured images. Further, the mapping manager 108 may provide guidance to a user of the computing device 104 for finding a reference, such as an object or location, within an environment that has been mapped by use of captured images. The computing device 104 may include a user interface 110 configured to receive user input and to present content to a user. For example, the user interface 110 may include a display capable of presenting video to a user. The computing device 104 may also include a network interface 112 for communication with other computing device via the Internet 106 or another communications network. Further, the computing device 104 may include a database 113, which may be any suitable type of memory device.

The web server 102 is shown as a single device but this is not a requirement. One or more programs, processes, or other code may comprise the server and be executed on one or more machines in one or more networked locations. The web server 102 may include a video manager 116 configured to access videos 118 stored in a database 120 for communication to computing devices via the Internet 106. The web server 102 and the computing device 104 may each include a network interface 112, 122 configured to interface with the Internet 106.

The operation of the system 100 can be described by the following example. As shown in FIG. 1, the web server 102 and the computing device 104 can each include various functional components and associated data stores to facilitate the operation and functions disclosed herein. However, it is noted that the operation and functions in accordance with embodiments of the present invention may be implemented at a single computing device or multiple computing devices, or using system components other than as shown in FIG. 1.

A user of the computing device 104 may use an application residing on the computing device 104 to capture one or more images of an environment for use in generating a map of the environment. The map may be used by the computing device 104 or another computing device for orienting the respective computing device within the environment. For example, the computing device 104 may capture images or video including a reference, and use the map to direct a user of the computing device to an object or location within the environment. The application may reside on the computing device 104 and be a part of the mapping manager 108. The user may, for example, input commands into the user interface 110 for opening and interacting with the application.

Figure 2:
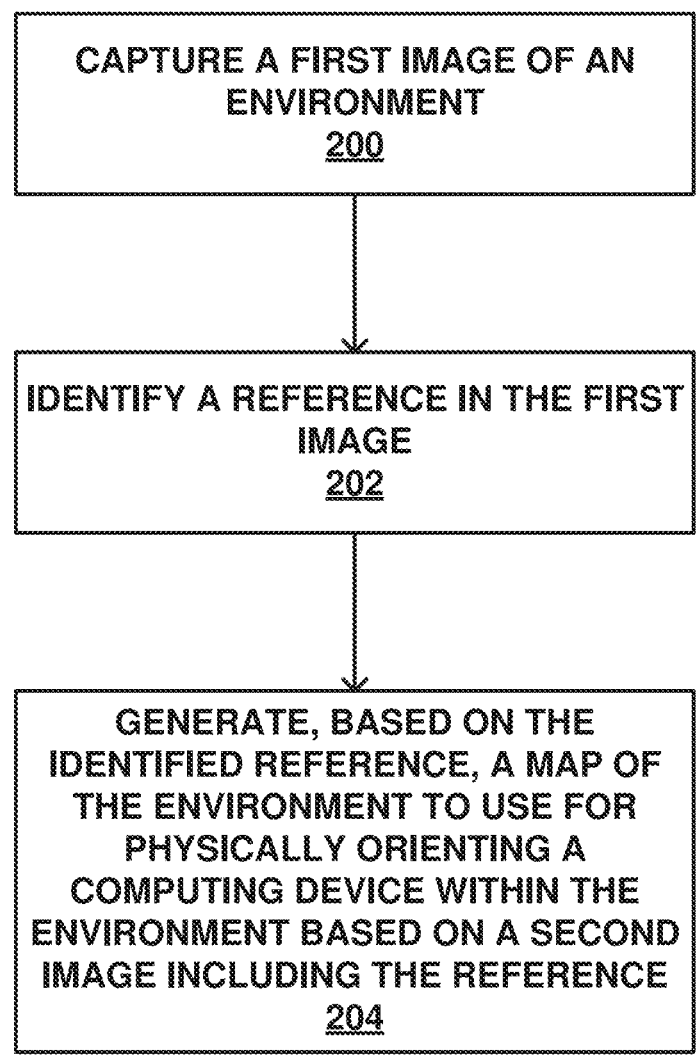
FIG. 2 is a flow chart of an example method for generating a map of an environment based on captured images in accordance with embodiments of the present invention.

FIG. 2 illustrates a flow chart of an example method for generating a map of an environment based on captured images in accordance with embodiments of the present invention. The method of FIG. 2 is described with respect to the example system 100 shown in FIG. 1, although the method may be implemented by any suitable system or computing device. The steps of FIG. 2 may be implemented entirely, or in part, by the mapping manager 108 and/or the web server 102 shown in FIG. 1. The mapping manager 108 and web server 102 may each be implemented by software, hardware, firmware, or combinations thereof.

Figure 4:
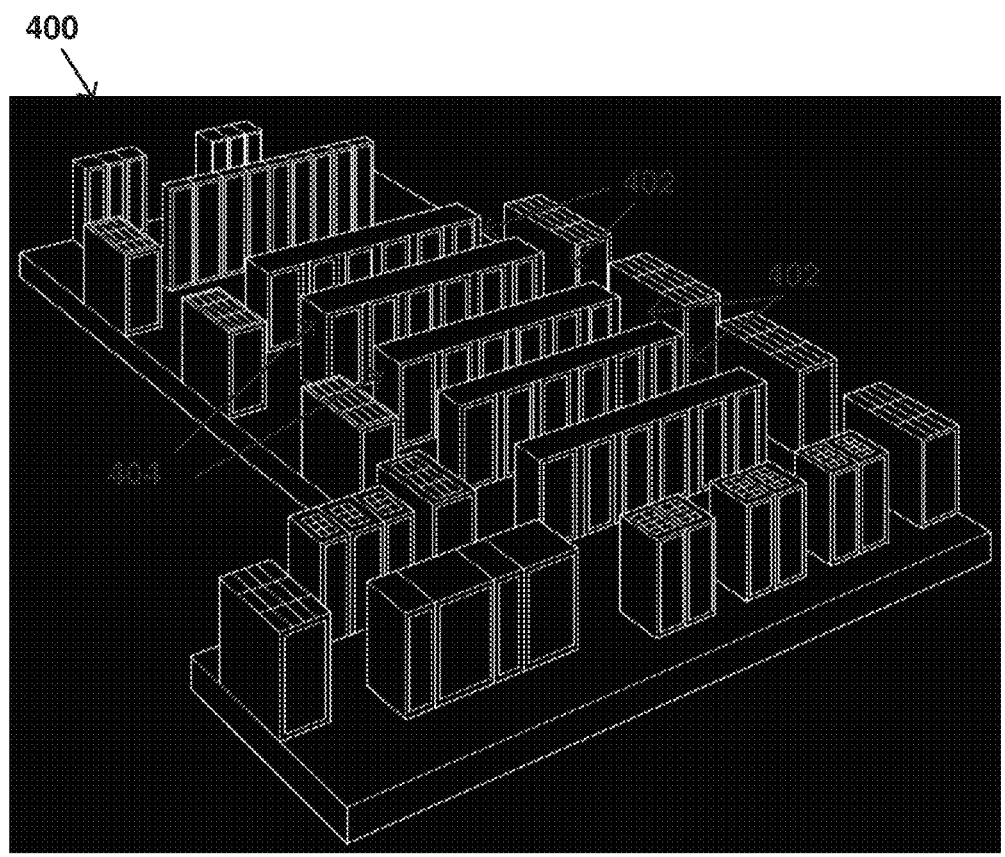
FIG. 4 is a perspective view of a floor plan of a data center including multiple racks containing servers in accordance with embodiments of the present invention.

Referring to FIG. 2, the method includes capturing 200 a first image of an environment. For example, the computing device 104 may include an image capture device 114, such as a camera, capable of capturing one or more images or video. The computing device 104 may be located within an environment 400, such as a data center environment including multiple servers. For example, FIG. 4 illustrates a perspective view of a floor plan of a data center environment, generally designated 400, including multiple racks containing servers. The computing device 104 may be carried by a person positioned within the data center environment 400. The person may direct the computing device 104 such that the image capture device 114 of the computing device 104 is positioned to capture one or more images or video of the interior of the data center environment 400.

In an example of capturing images of an environment, a user may control the computing device 104 to capture video of some or an entirety of the interior of the data center 400 shown in FIG. 4. The user may move the computing device 104 within aisles, generally designated 402, between server racks of the data center 400 to capture images of servers 404. The captured images may include one or more images of the servers and their surroundings within the data center 400. The image data may be stored in the database 113.

The method of FIG. 2 includes identifying 202 a reference in the first image. Continuing the aforementioned example, the mapping manager 108 may receive the captured images and identify one or more servers in the images. For example, the mapping manager 108 may be suitably configured for object recognition such that the servers can be recognized and identified. A user may input information into the user interface 110 for identifying servers shown in captured images. This information may be associated with the server shown in the image and stored in the database 113.

The method of FIG. 2 includes generating 204, based on the identified reference, a map of the environment to use for physically orienting a computing device within the environment based on a second image including the reference. Continuing the aforementioned example, objects and other imagery, such as locations, within the captured images may serve as references for mapping. For example, the floor, racks, servers, and other objects or locations within the data center 400 may be used for mapping the data center 400. The mapping manager 108 may use the captured images to identify such objects and locations, and their spatial relationship with one another based on locations of the objects and locations within the images. The mapping manager 108 may use this information for mapping some or all of the data center 400. Further, the mapping manager 108 may determine a direction of references with respect to other references. For example, the mapping manager 108 may use the determined spatial relationship between an entrance of an aisle to determine that a direction to a server is further into the aisle past the entrance. This information can be included in the generated map. Such information can be used, for example, to direct a computing device user looking for the server further down the aisle once an image of the aisle entrance has been captured.

In accordance with embodiments of the present invention, a map of an environment may be generated in a setup or configuration period in which multiple images are captured of the environment for serving as references. The images may be located in a grid that can correlate the images to a physical position within the environment. In an example, the mapping manager 108 may perform an image analysis and store information, such as identified shapes, objects, and the like, along with positional data into a searchable format stored in the database 113. Such information may also be communicated to server 102 via the Internet 106 for use by other computing devices. A user may provide input for constructing the grid. Further, the grid may be inferred from distance information obtained through a suitable image analysis technique.

Figure 3:
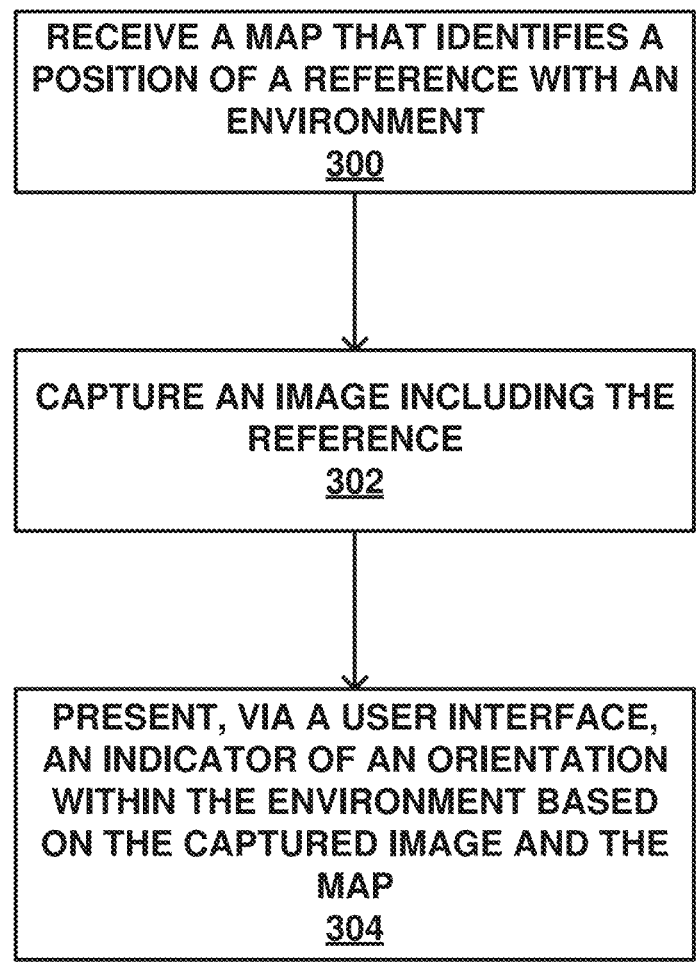
FIG. 3 is a flow chart of an example method for using a map of an environment based on captured images in accordance with embodiments of the present invention.

In accordance with embodiments of the present invention, FIG. 3 illustrates a flow chart of an example method for using a map of an environment based on captured images. The method of FIG. 3 is described with respect to the example system 100 shown in FIG. 1, although the method may be implemented by any suitable system or computing device. The steps of FIG. 3 may be implemented entirely, or in part, by the mapping manager 108 and/or the web server 102 shown in FIG. 1. The mapping manager 108 and web server 102 may each be implemented by software, hardware, firmware, or combinations thereof.

Referring to FIG. 3, the method includes receiving 300 a map that identifies a position of a reference with an environment. For example, the computing device 104 may receive from the web server 102 or have stored in database 113 an environment map, such as the map of the data center 400 generated in the example method of FIG. 2. The mapping manager 108 may access the map in response to input from a user of the computing device 104 via the user interface 110 for searching for a server within the data center 400.

Figure 5:
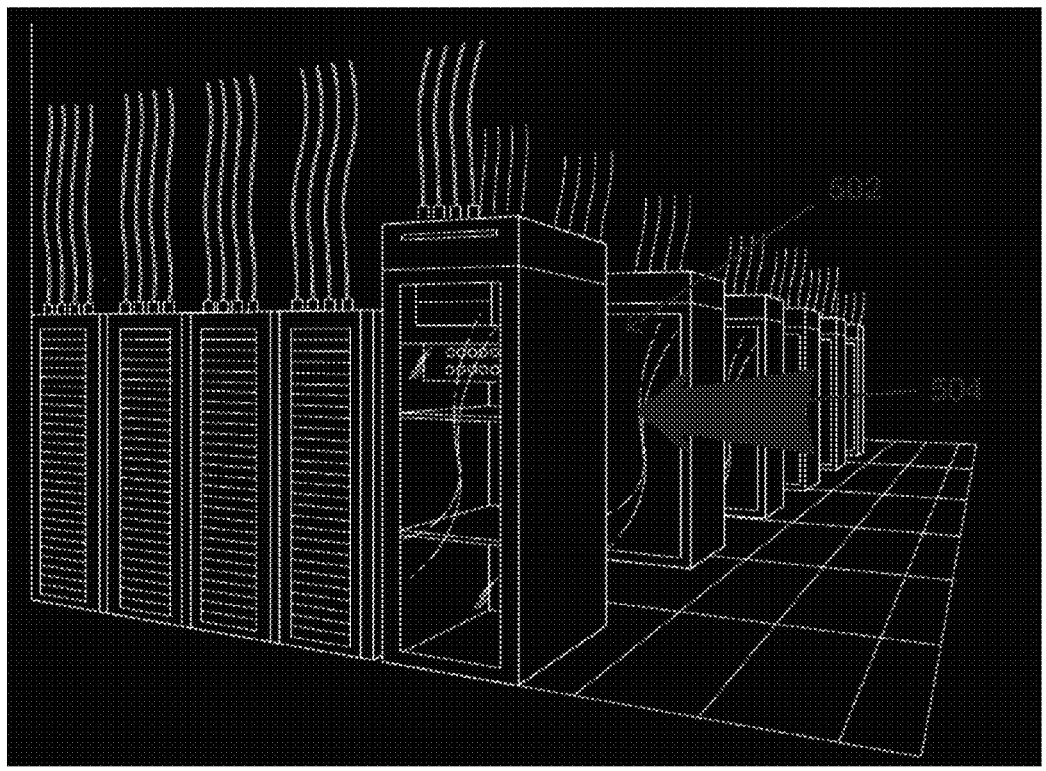
FIG. 5 shows an example image that has been captured as the user moves within a data center in accordance with embodiments of the present invention.

The method of FIG. 3 includes capturing 302 an image including the reference. Continuing the aforementioned example, the mapping manager 108 may activate the image capture device 114 for capturing one or more images or video in the data center 400 shown in FIG. 4. For example, a user may carry the computing device 104 and point the image capture device 114 in a direction that the user is moving within the data center 400. Further, a display of the user interface 110 may display a real-time image currently being captured by the image capture device 114. For example, FIG. 5 illustrates an example image that has been captured as the user moves within the data center 400 shown in FIG. 4 in accordance with embodiments of the present invention. In this example, an entrance 502 shown in FIG. 5 may be a reference identified in the captured image. The mapping manager 108 may use a suitable image recognition technique to identify the entrance 502 as a reference also identified with the map.

The method of FIG. 3 includes presenting 304, via a user interface, an indicator of an orientation within the environment based on the captured image and the map. Continuing the aforementioned example, the mapping manager 108 may use an augmented reality technique for overlaying an indicator on the image displayed in FIG. 5 for indicating an orientation within the data center. For example, the mapping manager 108 may display an indicator of a frame of reference for the user. As an example, the indicator may be an arrow that indicates the four cardinal directions (i.e., north, south, east, and west) with respect to the objects (e.g., aisles in a data center) shown in the displayed image.

In another example of displaying an indicator, the mapping manager 108 may have identification of an object or position within the data center 400 that the user needs assistance in locating. For example, the user may have used the user interface 110 to enter identification of a particular server within the data center 400 that needs maintenance. The map being used by the mapping manager 108 may have data indicating an orientation or direction of the identified server with respect to positions and/or other objects within the data center. By spatially relating the identified server with the positions and/or other objects, the map can be used to direct the user to the server based on one or more captured images or video. For example, the map may include data that indicates that the entrance 502 is an entrance for an aisle that includes the identified server. The mapping manager 108 may analyze the map to determine that the identified server is located in the aisle of entrance 502, and overlay an arrow 504 on the image shown in FIG. 5. The arrow 504 can indicate a direction towards the identified server. Subsequently, the computing device user may walk into the aisle, and the image capture device 114 may capture images of servers located in the aisle. The mapping manager 108 may use an image recognition technique to identify the server in a captured image, and may overlay an arrow or other indicator to indicate the identified server on a display of the user interface 110. In this way, the computing device 104 may use a map and captured images for guiding the user to an identified server.

In accordance with embodiments of the present invention, the mapping manager 108 may access information about a reference based on identification of the reference. For example, the database 113 or web server 102 may include information about a server, such as the server type and maintenance-related information. This information may be presented via a display of the user interface 110. In an example, this information may be presented for any object identified in a captured image. This information may be displayed in accordance with any suitable augmented reality technique.

In accordance with embodiments of the present invention, the mapping manager 108 may receive indication of a movement of a reference within an environment. For example, a server within a data center may be moved to another location. In response to the indication, the mapping manager 108 may remap a position of the reference within the environment based on the indicated movement of the reference. For example, a previously-generated map may be changed to indicate the spatial relationship between the moved server and one or more other references identified in the map.

In accordance with embodiments of the present invention, the computing device 104 may receive an alert or notification about an object (e.g., a server). In this case, the notification may identify the object. Subsequently, the user may interact with the user interface 110 to instruct the mapping manager 108 to assist with locating the object. The computing device 104 may be used to capture and display video of an environment, such as a data center. Subsequently, the mapping manager 108 may provide indicator on the displayed video to guide the user to the identified object in accordance with the present invention.

In accordance with embodiments of the present invention, any suitable object recognition technique may be used for identifying an object in a captured image. In an example, a shape, color, size, combinations thereof, and the like may be used by the mapping manager 108 for identifying a server. The mapping manager 108 may also identify the server as being a server for location. The server shown in a captured image may be highlighted or otherwise indicated in any suitable manner. In addition, various information may be displayed, such as serial number information. In an example, as the image capture device 114 captures images of various servers, real systems management information, such as system health, events, sensor data, and the like, may be displayed along with the server. This information may be retrieved through a suitable interface, such as the Common Interface Model (CIM) interface.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
at a mobile computing device comprising a processor and memory:
capturing a first image of a data center environment;
identifying a reference in the first image;
capturing a second image of the data center environment;
identifying the reference in the second image;
identifying other references in the first and second images;
determining spatial relationships between the reference and the other references based on a correlation of the first and second images to physical positions within the data center environment;
generating a map of the data center environment based on the determined spatial relationships between the reference and the other references; and
communicating the generated map to a server associated with the data center environment for provision of map requests.

2. The method of claim 1,
wherein generating a map comprises determining a direction of the reference with respect to another reference.

3. The method of claim 2, further comprising:
capturing a third image including the reference; and
presenting, via a user interface, an indicator to indicate the direction to the another reference.

4. The method of claim 1, further comprising:
presenting, via a user interface, an indicator of an orientation within the data center environment based on the second image and the generated map.

5. The method of claim 1, wherein identifying the reference comprises identifying one of an object and a location in the data center environment.

6. The method of claim 1, further comprising:
capturing a video of the data center environment; and
presenting the video and one or more indicators via a display to guide a user to one of a location and object within the data center environment based on the generated map.

7. The method of claim 1, further comprising:
  determining information about the reference based on identification of the reference; and
  presenting the information to a user.

8. The method of claim 1, wherein the data center environment includes a plurality of servers, and
  wherein the method further comprises:
    identifying a position of each of the servers within the generated map of the environment based on the first and second captured images; and
    using the generated map and the reference to guide a user to one of the plurality of servers based on the first and second images of the environment captured by the mobile computing device.

9. The method of claim 1, further comprising:
  receiving a message that identifies the reference; and
  in response to receiving the message, presenting, via a user interface, one or more indicators to indicate a direction to the reference based on the generated map.

10. The method of claim 1, further comprising:
  receiving indication of a movement of the reference within the data center environment; and
  remapping a position of the reference within the data center environment based on the indicated movement of the reference.

11. A method comprising:
  at a system within a data center environment, the system comprising a server and a mobile computing device;
  capturing, at the mobile computing device, first and second images of the data center environment;
  identifying, at the mobile computing device, a reference in the first and second images;
  identifying, at the mobile computing device, other references in the first and second images;
  determining, at the mobile computing device, spatial relationships between the reference and the other references based on a correlation of the first and second images to physical positions within the data center environment;
  generating, at the mobile computing device, a map of the data center environment based on the determined spatial relationships between the reference and the other references;
  receiving, at the server, the generated map;
  storing, at the server, the generated map;
  receiving, at the server, a request for the generated map, the generated map identifying a position of another server within the data center environment; and
  presenting, via a user interface of the system, an indicator of an orientation identifying the position of the another server within the data center environment based on the generated map, the indicator overlaying a captured third image.

12. The method of claim 11, wherein the reference is one of an object and a location in the data center environment.

13. The method of claim 11, wherein the indicator indicates a direction to another server within the data center environment.

14. The method of claim 11, further comprising:
  identifying the reference in the captured images; and
  in response to identifying the reference, presenting the indicator via the user interface.

15. The method of claim 11, wherein the captured images are part of a captured video of the data center environment, and
  wherein the method further comprises presenting the video and one or more indicators via display to guide a user to one of a location and object within the data center environment based on the generated map.

16. The method of claim 15, wherein the one or more indicators provide direction from a current location of the user to the location of the another server within the data center environment.

17. A system comprising:
  a mapping manager including at least a processor and memory configured to:
  capture a first image of a data center environment;
  identify a reference in the first image;
  capture a second image of the data center environment;
  identify the reference in the second image;
  identify other references in the first and second images;
  determine spatial relationships between the reference and the other references based on a correlation of the first and second images to physical positions within the data center environment;
  generate a map of the data center environment based on the determined spatial relationships between the reference and the other references; and
  communicate the generated map to a server associated with the data center environment for provision of map requests.

18. The system of claim 17, wherein the mapping manager is configured to
  determine a direction of the reference with respect to another reference.

19. The system of claim 18, wherein the mapping manager is configured to:
  capture a third image including the reference; and
  present, via a user interface, an indicator to indicate the direction to the another reference.

20. The system of claim 17, wherein the mapping manager is configured to:
  capture the second image including the reference; and
  present, via a user interface, an indicator of an orientation within the data center environment based on the second image and the generated map.

\* \* \* \* \*